United States Patent [19]

Rice

[11] Patent Number: 5,003,823
[45] Date of Patent: Apr. 2, 1991

[54] NONCONTACT ROTATING LIQUID FILM THICKNESS SENSOR

[75] Inventor: Richard W. Rice, Belvidere, Ill.

[73] Assignee: Sundstrand Corporation, Rockford, Ill.

[21] Appl. No.: 396,240

[22] Filed: Aug. 21, 1989

[51] Int. Cl.⁵ .................. G01F 23/26; G01N 21/41
[52] U.S. Cl. .................. 73/293; 250/227.3; 250/577; 340/619
[58] Field of Search .............. 73/293, 327; 350/96.29; 250/577, 227.3; 356/435, 161; 340/619

[56] References Cited

U.S. PATENT DOCUMENTS

| | | | |
|---|---|---|---|
| 3,704,060 | 11/1972 | McNaney | 350/96.29 X |
| 3,969,941 | 7/1976 | Rapp | 73/290 R X |
| 3,997,268 | 12/1976 | Fladda et al. | |
| 4,035,635 | 7/1977 | Crosland et al. | |
| 4,132,899 | 1/1979 | Shigemasa et al. | 73/293 X |
| 4,170,731 | 10/1979 | Howell et al. | 350/96.2 |
| 4,182,259 | 1/1980 | Garner et al. | |
| 4,355,903 | 10/1982 | Sandercock | |
| 4,606,641 | 8/1986 | Yamada et al. | |
| 4,727,356 | 2/1988 | Abe et al. | 250/231.13 |
| 4,880,990 | 11/1989 | Rando | 73/293 X |

FOREIGN PATENT DOCUMENTS 5815103 7/1981 Japan.

OTHER PUBLICATIONS

"Optical Fibers, Glass Probe Sense Liquid Level", *Design News*, (#1019) Nov. 21, 1988, (David J. Bak-East Coast Editor), 2 pages.

*Primary Examiner*—Daniel M. Yasich
*Attorney, Agent, or Firm*—Wood, Phillips, Mason, Recktenwald & Vansanten

[57] ABSTRACT

The problem of measuring oil film thickness in a rotating housing (66) is solved using a noncontact liquid film thickness sensor. The housing (66) is rotatable about an axis (58) and includes a cylindrical outer wall coaxial to the axis. A plurality of U-shaped glass rods (70) are within the rotating housing (66) and have opposite legs (72, 74) mounted through openings in the outer wall. At least one leg (72) of each rod (70) is coplanar with a similar leg of each other rod. Each rod (70) has a different length between its opposite legs (72, 74). A light source (76) is provided outwardly of the housing (66) and coplanar with the coplanar legs (72). A sight glass (80) or other sensing device is provided outwardly of the housing (66) proximate the path of movement of the opposite leg (74) of each of the rods.

8 Claims, 4 Drawing Sheets

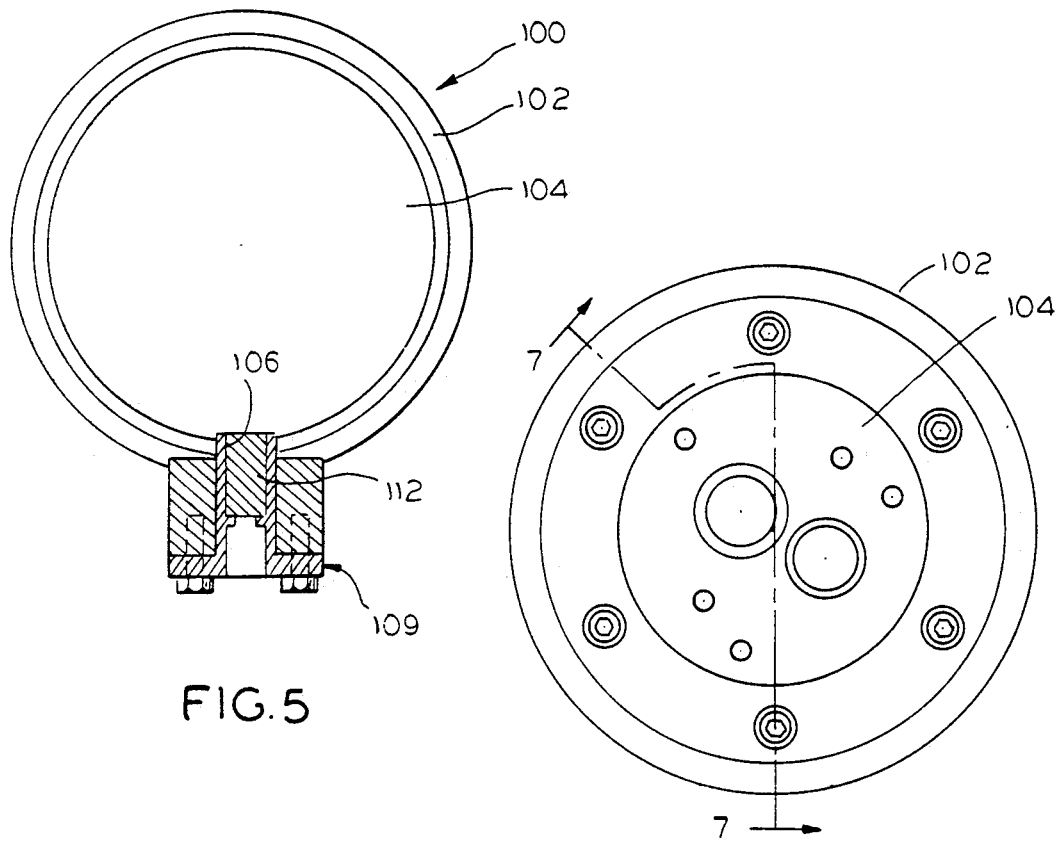
FIG.5
FIG.6
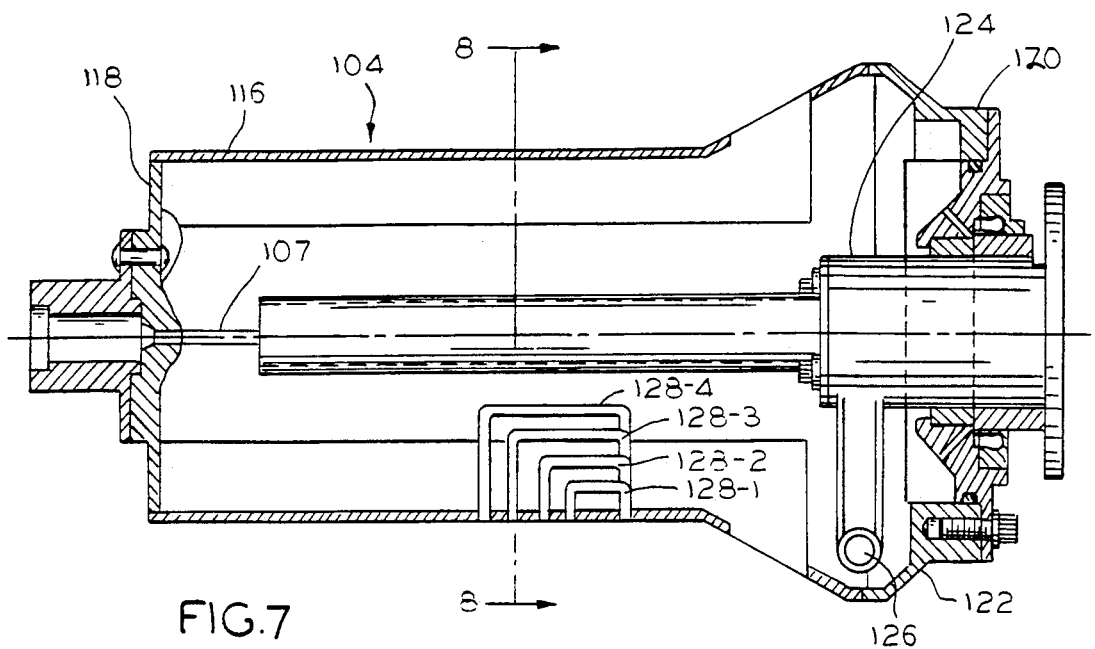
FIG.7

NONCONTACT ROTATING LIQUID FILM THICKNESS SENSOR

FIELD OF THE INVENTION

This invention relates to a measurement apparatus and, more particularly, to a noncontact sensor for sensing liquid film thickness.

BACKGROUND OF THE INVENTION

The level of oil, or the oil film thickness, within a high speed, rotating device has proven difficult to accurately measure. Certain power generating systems, such as in an aircraft power system, include an integrated drive generator which utilizes oil for cooling, fluid power and lubrication. A rotary fluid management device (RFMD) which acts as a centrifugal oil pump may also operate as a deaerator to separate air which is trapped in the oil. Such an RFMD includes a pitot tube which must have a sufficient oil pressure thereon to operate properly. Therefore, the oil film thickness clinging to a rotating inner wall plays an important role in the performance and efficiency of the device.

It is, therefore, important to measure with repeatability and accuracy a specific oil level which must be maintained within a rotating device. Moreover, noncontact between the measuring device and the RFMD is essential because of tare losses added with contact, as well as possibly influencing the characteristics of the article being tested.

The present invention is intended to overcome one or more of the problems as set forth above.

SUMMARY OF THE INVENTION

In accordance with the present invention, an accurate tool is provided for sensing liquid film thickness in a rotating device.

According to one aspect of the invention, a liquid sensor is provided for sensing a select discrete level in a container. The sensor comprises an elongated glass rod internal to the container, the rod having opposite ends received in openings through a container wall and a bend intermediate the ends. The bend is spaced from the container wall a distance equal to the discrete level to be sensed. The rod has an index of refraction less than that of the liquid to be sensed. A light source is disposed proximate one of the ends of the glass rod, wherein light entering the one end of the glass rod exits the other end thereof only if the liquid level is less than the select level.

It is a feature of the invention that the glass rod comprises a borosilicate glass which has a low thermal expansion coefficient.

According to another aspect of the invention, a noncontact liquid sensor is provided for sensing a select discrete level of a liquid in a moving container. The sensor comprises an elongated glass rod internal to and movable with the container, the rod being U-shaped and having opposite legs each having an end received in an opening through a container wall. The legs have a length corresponding to the discrete level to be sensed. The rod has an index of refraction less than that of the liquid to be sensed. Means are provided for supporting a light source outwardly of the container disposed proximate a select path of movement of one end of the glass rod, wherein light entering the one end of the glass rod when the one end thereof is proximate the light source exits the other end thereof only if the liquid level is less than the select level.

In accordance with yet another aspect of the invention, a noncontact liquid sensor is provided for sensing a plurality of select discrete levels of a liquid in a rotating container. The sensor comprises a plurality of elongated glass rods internal to and movable with the container. Each rod is U-shaped and has opposite legs each having an end received in an opening through a container wall. The legs of each glass rod have a length corresponding to one of the select discrete levels to be sensed. Each rod has an index of refraction less than that of the liquid to be sensed. Means are provided for supporting a light source outwardly of the container disposed proximate a select path of movement of one end of each of the glass rods, wherein light entering the one end of any glass rod when the one end thereof is proximate the light source exits the other end of the particular rod only if the liquid level is less than the associated select level.

Specifically, in one embodiment, the container comprises a housing rotatable about an axis. The housing includes a cylindrical outer wall coaxial to the axis. A plurality of U-shaped glass rods are within the rotating housing and have opposite legs mounted through openings in the wall of the rotating housing. At least one leg of each rod is coplanar with a similar leg of each other rod. Each rod has a different length between its opposite legs. The light source is provided outwardly of the housing and coplanar with the coplanar legs. A sight glass or other sensing device is provided outwardly of the housing proximate the path of movement of the opposite leg of each of the rods.

The light from the source enters each rod at the coplanar leg end. Assuming the light enters at other than the critical angle, the majority of the light stays in the rod and exits at the opposite leg where it can be viewed in the sight glass, depending upon the rotational position of the rotating element. However, liquid has a higher refractory index than the glass rod. Therefore, once liquid surrounds the rod the light does not bounce and, instead, passes straight through into the liquid. Thus, if any particular rod is totally submerged in the liquid, then the light will not be evident at the sight glass.

Each glass rod, therefore, acts as a discrete level sensing element which provides an indication as to whether the liquid is above or below a preselected level, depending upon the length of the particular rod's legs. By utilizing a plurality of rods, a plurality of discrete levels can be sensed simultaneously by viewing each one through the sight glass. Different cross lengths between opposite legs are used to distinguish between the different rods.

Further features and advantages of the invention will readily be apparent from the specification and from the drawings.

BRIEF DESCRIPTION OF THE DRAWINGS

FIG. 5 is a sectional view taken along the line 5—5 of FIG. 4;

FIG. 6 is a sectional view taken along the line 6—6 of FIG. 4;

FIG. 7 is a sectional view taken along the line 7—7 of FIG. 6;

DESCRIPTION OF THE INVENTION

Figures 1, 2, 3:
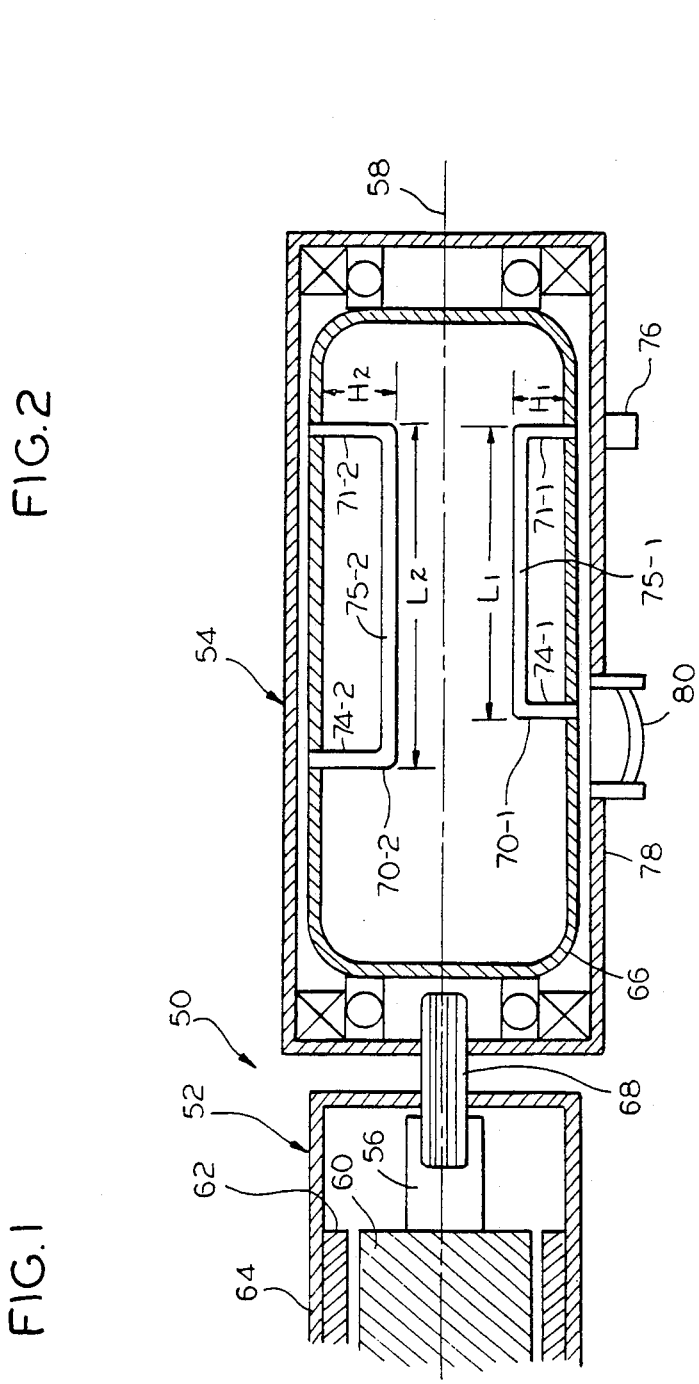
FIG. 1 is a side elevation illustrating the film thickness sensor according to the invention, with the film thickness below a select level.
FIG. 2 is a side elevation illustrating the film thickness sensor according to the invention, with the film thickness above a select level.
FIG. 3 is a plan generally illustrating a prime mover and RFMD test apparatus including a plurality of liquid thickness film sensors according to the invention.

Referring first to FIGS. 1 and 2, a liquid film thickness sensor 10 according to the invention is illustrated. Specifically, the sensor 10 is operable for sensing a select discrete liquid film thickness. FIG. 1 illustrates the thickness being below the select level, while FIG. 2 illustrates the thickness being above the select level.

The sensor 10 includes a single piece, continuous, U-shaped glass rod 12. The rod 12 has opposite legs 14 and 16 each having a respective associated end 18 and 20 received in openings through a wall 22. The legs 14 and 16 are bent to a controlled radius at elbows 26 and 28, forming a cross section 24. The rod 12 has a height represented by a length $H_A$ of the legs 14 and 16. The select discrete level to be sensed is the level $H_B$ which represents a difference between the leg length $H_A$ and the thickness of the wall 22.

A light source 30 including a high intensity light 32 is disposed proximate the first leg end 18.

As is well known, the index of refraction is defined to be unity for free air. The index for any other dielectric is a measure of the phase velocity of electromagnetic waves in the medium relative to free space. It is common to use the index to characterize properties of dielectrics in the infrared and optical frequency range.

If light is incident on the boundary between two media, some of the light is reflected and some of the light is transmitted, undergoing refraction, into the second medium. At a simple interface between two dielectric materials, the amplitude of the reflected light is a function of the ratio of the refractive indices of the two materials, the polarization of the incident light, and the angle of incidence.

The elongated glass rod 12 may be of, for example, borosilicate glass which has a low thermal expansion coefficient. Such a glass is well suited for applications where high temperature, thermal shock or resistance to chemical attack are primary considerations. The index of refraction of such glasses may vary considerably from batch to batch, but typical values are on the order of 1.475.

The glass rod 12 of the sensor 10 operates by total internal reflection. Rays internally incident upon an air to glass boundary, at angles greater than the critical angle, are reflected with 100% efficiency regardless of their initial polarization state. With an oil to glass boundary the reflected efficiency is somewhat less than 100% and depends on the ratio of the refractive indices which is a function of wavelength. If, at some wavelength, the ratio should fall to less than 1.414, the critical angle exceeds 45°, and the total internal reflection will fail for a collimated beam internally incident at 45°. The critical angle in the borosilicate glass rods, discussed above, with all factors taken into account is approximately 42°.

Referring specifically to FIG. 1, with the light 32 illuminated, and the thickness of an oil film F less than the height $H_B$, the light enters the first leg 14 of the glass rod, is reflected at the elbow 26 and passes through the cross section 24, and is again reflected at the second elbow 28 through the second leg 16 and out the second leg end 20. Thus, when viewing the second leg end 20, the same will be illuminated.

With reference to FIG. 2, wherein the thickness of the film F is greater than the height $H_B$, the light entering the first leg 14 is only partially reflected at the elbow 26 with the remaining light transmitted into the liquid L. The reflected light passes through the cross section 24, indicated by the dashed line. Subsequently, when the light encounters the second elbow 28, most of the light is transmitted into the liquid L, with some of the light reflected into the second leg 16. However, the amount of light reflected is minimal compared to the light provided by the source 30. Therefore, little or no light exits the second leg end 20 which therefore appears greatly darkened.

As is apparent from the above, the presence or absence of light at the rod second leg end 20 provides an indication as to whether or not the thickness of the liquid film F is greater than or less than the select height $H_B$.

As discussed above, in certain rotating elements, such as an integrated drive generator, it is necessary to maintain a minimum liquid film thickness. Such an integrated drive generator includes a generator and a rotary fluid management device, or RFMD. The RFMD acts as a centrifugal oil pump for supplying the integrated drive generator, and also as a deaerator. In fact, an RFMD can be used with other apparatus requiring deaerated oil.

With reference to FIG. 3, a test apparatus 50 includes a prime mover, or motor, 52 and an RFMD 54. The apparatus 50 is used to determine oil input requirements to the RFMD 54 to establish a desired output.

The motor 52 includes a shaft 56 rotational about an axis represented by a line 58. A rotor 60 is carried on the shaft and is spaced inwardly of a stator 62, the rotor 60 and stator 62 including suitable windings for developing motive power in a conventional manner. The rotor 60 and stator 62 are carried in a housing 64.

The RFMD 54 includes a rotating housing 66 interconnected using a shaft 68 to the motor shaft 56. Therefore, for test purposes, the rotating housing 66 is rotatable with the motor shaft 56 and acts as a centrifugal oil pump.

The rotating housing 66 includes a plurality of U-shaped glass rods, represented by first and second rods 70-1 and 70-2. The first glass rod 70-1 defines a height H1 from an interior wall of the housing 66 which is less than a similar height H2 for the second glass rod 70-2. Thus, the first glass rod 70-1 is operable to sense a liquid film of a thickness H1, while the second glass rod 70-2 is operable to detect a liquid film having a thickness H2. The first glass rod 70-1 has a cross section length L1 less than a cross section length L2 for the second glass rod 70-2.

Each glass rod 70 is mounted to the rotating housing 66 similarly as was the glass rod 12 to the wall 22, see FIGS. 1 and 2. (For simplicity herein, any element having a plurality of configurations is referred to with a reference numeral only when discussed generally, and with a reference numeral including a suffix when referring to a specific configuration.)

Each glass rod 70 is mounted to the rotating element 66 with its cross section 75 parallel to the axis 58 and its legs 72 and 74 extending radially therefrom. The first legs 72 of each of the rods 70 are coplanar on a plane which is perpendicular to the axis 58. Due to the differences in the lengths L1 and L2 of the respective rods 70-1 and 70-2, the second legs 74-1 and 74-2 are noncoplanar and, in fact, are axially spaced.

The test apparatus 50 further includes a light source 76 mounted to an outer stationary housing 78. The light source 76 is coplanar with the first legs 72. A sight glass 80 is mounted to the outer housing 78 and is disposed proximate the second legs 74 for each glass rod 70. The sight glass 80 has a length greater than the axial spacing between the second legs 74.

The rotating housing 66 rotates about the axis 58, so that the end of each rod first leg 72 rotates in a rotary path whereby during each revolution each first leg 72 is disposed proximate the light source 76 at a select rotational position. Similarly, the second leg 74 of each rod 70 moves in a rotary path parallel to the path of the first leg 72. As a result, the second leg 74 of each rod 70 is disposed proximate the sight glass 80 simultaneous with its associated first leg 72 being disposed proximate the light source 76, once during each revolution of the rotating housing 66.

In operation, and assuming the light source 76 is illuminated, and if the liquid film thickness is less than the height H1, then during the point in any revolution wherein either rod 70 has its first leg 72 disposed proximate the light source 76, then reflected light which exits its second leg 74 is visible through the sight glass 80. However, as discussed above relative to FIGS. 1 and 2, the light is not visible through the sight glass 80 at the axial positions of the second legs 74-1 and 74-2 once the film thickness exceeds the respective heights H1 and H2.

Figure 4:
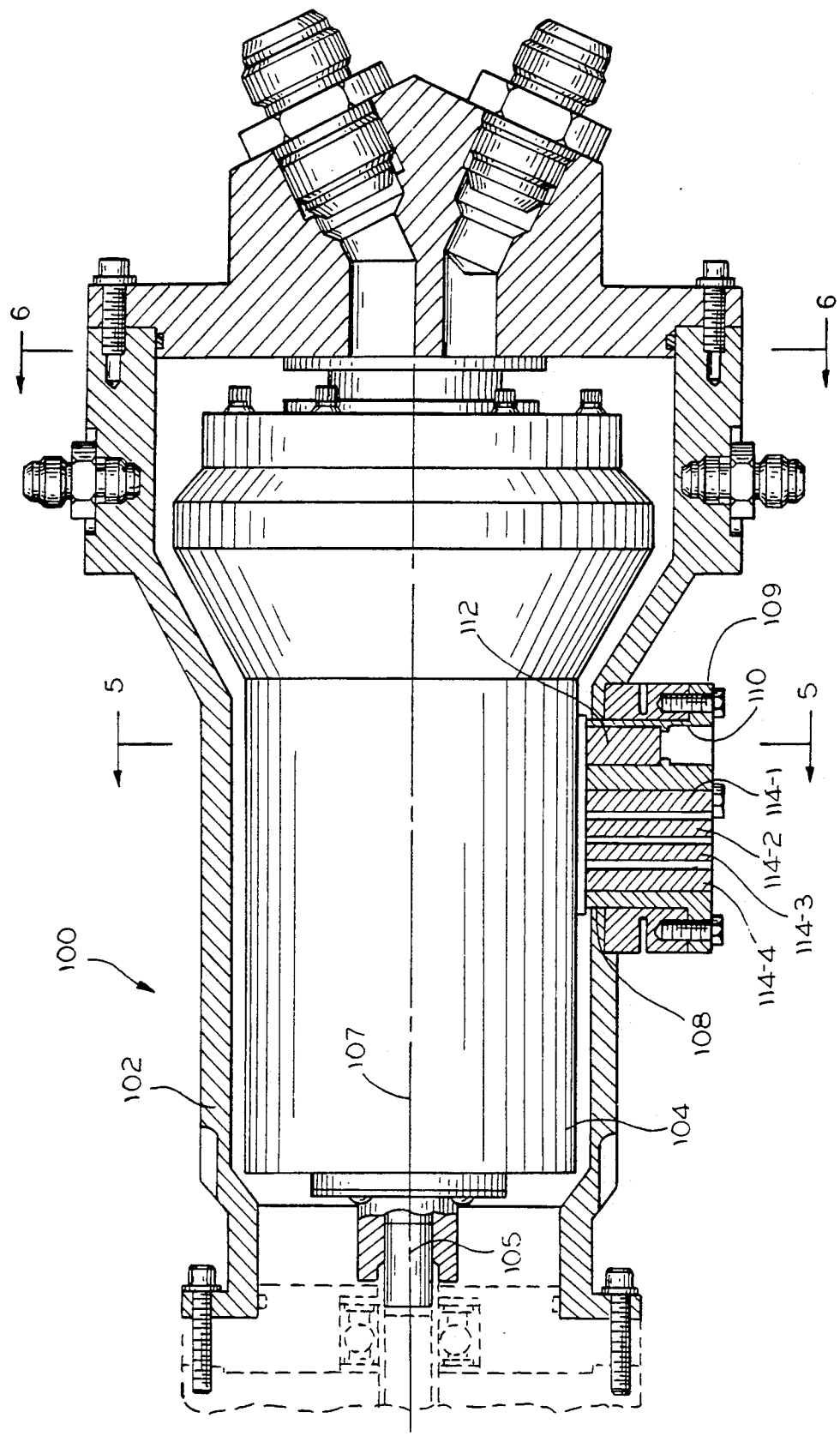
FIG. 4 is a partially sectional detailed plan of an alternative embodiment of an RFMD test apparatus.

Referring to FIGS. 4 and 5, an RFMD test apparatus 100 according to an alternative embodiment of the invention is illustrated.

The RFMD 100 includes an outer stationary housing 102 carrying a rotating housing 104 therein. The rotating housing 104 is coupled to a shaft 105 and is thus rotational about an axis indicated by a line 107. Fastened to the outer housing 102 through an opening 108 is a block 109. The block 109 has an enlarged bore 110 receiving a relatively large diameter glass rod 112 which extends partially therethrough, and four spaced, parallel smaller diameter rods 114-1 through 114-4 which are received in smaller diameter bores which extend through the block 109. The larger diameter rod is of a smaller length so that a light source, such as the light source 32 shown in FIGS. 1 and 2, can be inserted into the bore 110 in contact with the rod 112.

Figure 8:
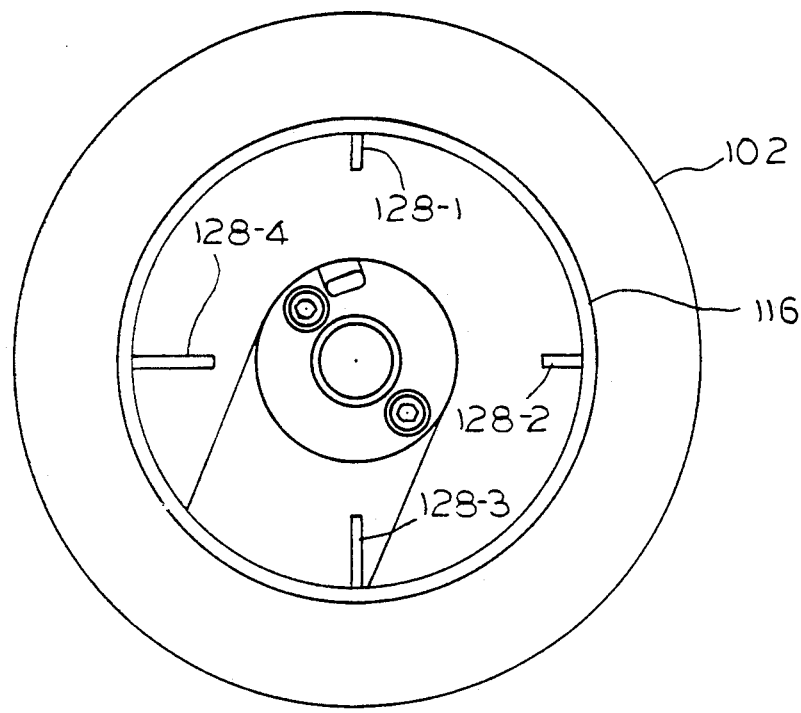
FIG. 8 is a sectional view taken along the line 8—8 of FIG. 7.

With reference to FIGS. 6-8, the rotating housing 104 is illustrated in greater detail.

The rotating housing 104 comprises a cylindrical drum having an outer wall 116 between opposite end walls 118 and 120. The cylindrical wall 116 is enlarged at one end 122 adjacent the end wall 120. Secured to the end wall 120 is a pitot tube 124 having an opening 126 radially outwardly of the narrower extent of the cylindrical wall 116.

As is well known, as the rotating housing 104 rotates about the axis 10 oil is held against the outer wall 116 by centrifugal force, the oil is deaerated, and the RFMD acts as a charge pump using the pitot tube 124. However, it is necessary that there is sufficient film thickness to create pressure on the pitot tube 124. As a result, the RFMD test apparatus 100 according to the invention includes liquid film thickness sensors used to determine input requirements to establish a desired output.

Mounted inwardly and to the cylindrical wall 116 are four elongated U-shaped glass rods 128-1 through 128-4. Each rod is mounted 90° circumferentially with respect to adjacent rods, as illustrated in FIG. 8, with one leg of each rod 128 coplanar, similar to that discussed above relative to FIG. 3. Also, the rods 128 are mounted so that when the rotating element 104 is mounted in the housing 102, the coplanar leg of each rod 128 is coplanar with the block large glass rod 112, see FIG. 4.

Each glass rod 128 is generally similar in construction to the glass rod 12, see FIGS. 1 and 2.

The cross section length of each glass rod 128 corresponds to the spacing between the block large rod 112 and each of the respective smaller rods 114-1 through 114-4. For example, the cross piece length of the glass rod 128-1 is equal to the spacing between the block large glass rod 112 and the first small glass rod 114-1. The height of the legs of each glass rod 128 is selected to sense a discrete film thickness level, as discussed above.

As a result, with a suitable light source installed in the bore 110, all light enters into the housing 112 in a plane coplanar with the one leg of each of the glass rods 128. As the rotating element 104 rotates, and it is at a rotational position whereat one of the glass rods 128 is disposed immediately adjacent the block large rod 112, light enters the particular glass 128 and travels the length and exits the opposite end provided its two 90°. elbows are above the liquid film that is centrifugally held against the rotating element wall 116. When the particular glass rod 128 becomes covered by the liquid film, and the 90° elbows are submerged, then light will escape into the surrounding medium. Therefore, light will no longer be visible at the sensing element represented by the associated particular small block glass rod 114.

Thus, the RFMD test apparatus 100 is operable to detect four select liquid film thickness levels represented by the height of the legs of the respective glass rods 128-1 through 128-4.

Figure 9:
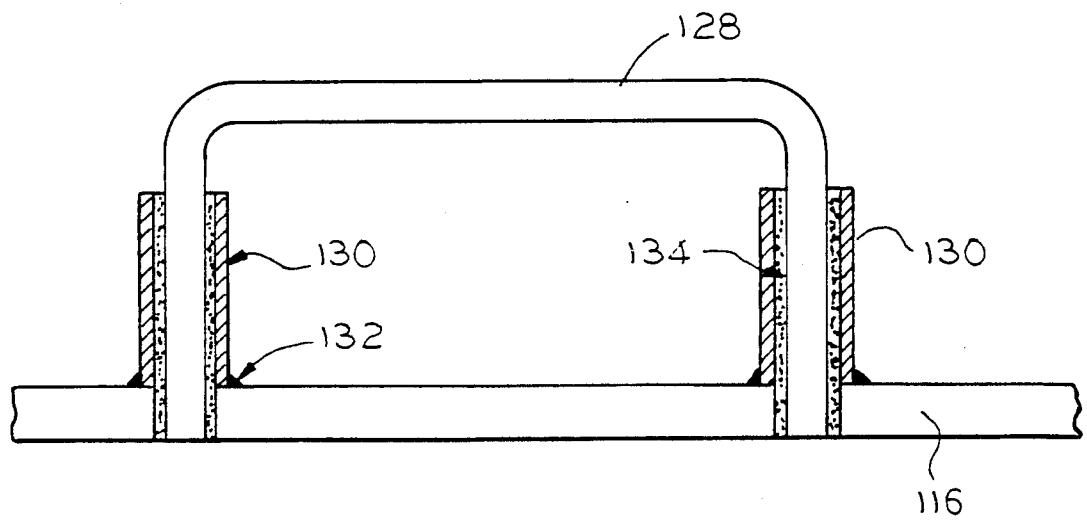
FIG. 9 is a sectional elevation illustrating installation of the liquid film thickness sensor glass rod.

With reference to FIG. 9, mounting of each of the glass rods 128 to the cylindrical wall 116 is illustrated.

A typical RFMD centrifugal drum wall 116 is made of aluminum which has a high thermal expansion coefficient. The borosilicate glass rods, however, have a lower coefficient. To prevent failure of a bond which might result from using an adhesive, aluminum tubes 130 are used to add support to the legs of the rods 128 as well as to provide like material for an adhesive 132 which adheres to the tube 130 to the wall 116. The spacing between the glass rod 128 and the tube 130, as well as the glass rod 128 and the holes provided in the wall 116 for receiving the glass rod 128 can be filled with a solvent resistant sealant 134 having a temperature range on the order of −85° F. to 450° F., with a lap shear of 260 psi on unprimed aluminum and tensile strength of 300 psi. The outer ends of the rod 128 are then ground flush with the outer surface of the wall 116.

Thus, the invention broadly comprehends a noncontact liquid film thickness sensor which provides accurate level measurement without producing tare losses in operation which might influence the characteristic of the article being tested.

I claim:

1. A noncontact liquid sensor for sensing a select discrete level of a liquid in a container travelling in a select path of movement comprising:

an elongated glass rod internal to and attached to said container, the rod being U-shaped and having opposite legs each having an end received in an opening through a wall of said container such that said ends have selected paths of movement, the legs having a length corresponding to the discrete level to be sensed, said rod having an index of refraction less than that of the liquid to be sensed;

a light source; and means for supporting said light source outwardly of the container disposed proximate a point in the select path of movement of one end of said glass rod;

wherein light entering the one end of the glass rod when the one end thereof is proximate said light source exits the other end thereof only if the liquid level is less than the select level.

2. The liquid sensor of claim 1 wherein said supporting means further comprises a sight glass disposed proximate a select path of movement of the other end of the glass rod.

3. The liquid sensor of claim 1 wherein said container is rotational about an axis and said rod legs extend radially outwardly from said axis.

4. A noncontact liquid sensor for sensing a plurality of select discrete levels of a liquid in a rotating housing comprising:

a plurality of elongated glass rods internal to and movable with the housing, each rod being U-shaped and having opposite legs each having an end received in an opening through a housing wall, the legs of each rod having a length corresponding to one of the discrete levels to be sensed, said rods having an index of refraction less than that of the liquid to be sensed;

a light source; and means for supporting said light source outwardly of the housing disposed proximate a select path of movement of one end of each of the glass rods, wherein light entering the one end of any glass rod when the one end thereof is proximate said light source exits the other end thereof only if the liquid level is less than the one select level.

5. The liquid sensor of claim 4 wherein said supporting means further comprises a sight glass disposed proximate a select path of movement of the other end of the glass rod.

6. The liquid sensor of claim 4 wherein said container is rotational about an axis and said rod legs extend radially outwardly from said axis.

7. The liquid sensor of claim 4 wherein axial spacing between legs of each glass rod is different.

8. The liquid sensor of claim 4 wherein one leg of each rod is coplanar with a leg for each other rod.

* * * * *